US009185677B2

United States Patent
Cho et al.

(10) Patent No.: US 9,185,677 B2
(45) Date of Patent: Nov. 10, 2015

(54) METHOD DEVICE AND SYSTEM FOR ESTIMATING ACCESS POINTS USING LOG DATA

(71) Applicants: Chae Hwan Cho, Gwacheon Si Gyeonggi-Do (KR); Song Man Lee, Incheo Si Gyeonggi-Do (KR); Suk Yon Kang, Seoul (KR); Ji Min Kim, Goyang-si Gyeonggi-Do (KR); Chun Young Kim, Seoul (KR)

(72) Inventors: Chae Hwan Cho, Gwacheon Si Gyeonggi-Do (KR); Song Man Lee, Incheo Si Gyeonggi-Do (KR); Suk Yon Kang, Seoul (KR); Ji Min Kim, Goyang-si Gyeonggi-Do (KR); Chun Young Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 289 days.

(21) Appl. No.: 13/867,777

(22) Filed: Apr. 22, 2013

(65) Prior Publication Data
US 2013/0235749 A1 Sep. 12, 2013

Related U.S. Application Data

(63) Continuation of application No. PCT/KR2011/007726, filed on Oct. 18, 2011.

(30) Foreign Application Priority Data

Oct. 22, 2010 (KR) .................. 10-2010-0103408

(51) Int. Cl.
*H04W 64/00* (2009.01)
*G01S 5/02* (2010.01)

(52) U.S. Cl.
CPC ........... *H04W 64/003* (2013.01); *G01S 5/0242* (2013.01); *G01S 5/0252* (2013.01)

(58) Field of Classification Search
None
See application file for complete search history.

(56) References Cited

U.S. PATENT DOCUMENTS

| | | | |
|---|---|---|---|
| 8,787,228 B2 * | 7/2014 | Avital et al. | 370/311 |
| 2007/0238448 A1 * | 10/2007 | Gallagher et al. | 455/414.2 |
| 2008/0076430 A1 * | 3/2008 | Olson | 455/440 |
| 2010/0265092 A1 * | 10/2010 | Kim et al. | 340/825.49 |
| 2010/0317390 A1 * | 12/2010 | Rekimoto | 455/511 |

FOREIGN PATENT DOCUMENTS

| | | |
|---|---|---|
| KR | 100645355 | 11/2006 |
| KR | 1020080099940 | 11/2008 |
| KR | 1020090008791 | 1/2009 |
| KR | 1020090055104 A | 6/2009 |
| KR | 1020090095773 A | 9/2009 |
| WO | 2007040351 A1 | 4/2007 |

OTHER PUBLICATIONS

International Search Report for PCT/KR2011/007726.
Korean Office Action dated Mar. 26, 2014.

* cited by examiner

*Primary Examiner* — Hassan Phillips
*Assistant Examiner* — Saba Tsegaye
(74) *Attorney, Agent, or Firm* — Hauptman Ham, LLP

(57) ABSTRACT

The present disclosure provides a system, device and method for estimating an AP location using log data. Information, which is not pre-stored in a database when the information is updated, is classified and then location information of an AP is estimated by using log data of a user in such a manner of estimating a location of the AP by using log data of a user in wireless LAN based positioning and thus updating the database for the wireless LAN based positioning, thereby improving positioning accuracy.

16 Claims, 7 Drawing Sheets

| Received Signal Strength Range | Weight Value |
|---|---|
| -10 ~19 | W1 |
| -20 ~ 29 | W2 |
| -30 ~ 39 | W3 |
| -40 ~ 49 | W4 |
| -50 ~ 59 | W5 |
| -60 ~ 69 | W6 |
| -70 ~ 79 | W7 |
| -80 ~ 89 | W8 |
| -90 ~ 99 | W9 |

*FIG. 5*

METHOD DEVICE AND SYSTEM FOR ESTIMATING ACCESS POINTS USING LOG DATA

CROSS-REFERENCE TO RELATED APPLICATION

The present application is a continuation of International Application No. PCT/KR2011/007726 filed Oct. 18, 2011, which is based on, and claims priority from, KR Application Serial Numbers 10-2010-0103408, filed on Oct. 22, 2010. The disclosures of the above-listed applications are hereby incorporated by reference herein in their entirety.

FIELD

The present disclosure relates to estimating an access point (AP) location using log data.

The statements in this section merely provide background information related to the present disclosure and may not constitute prior art.

As computer, electronic, and communication technologies are rapidly developed, various wireless communication services using a wireless network are provided. The services provided by a mobile communication system using the wireless network are evolving into a multimedia service such as transmitting circuit data, packet data and the like on top of the voice data.

In particularly, a Location Based Service (LBS) among various wireless Internet services using a mobile communication terminal is under spotlight spotlighted due to its wide usability and convenience. The location based service generally refers to a communication service for detecting a location of the mobile communication terminal such as a mobile phone, a Personal Digital Assistant (PDA) and the like, and providing additional information related to the detected location. A location measurement technology for use in the location based service may be classified into a network-based mode for identifying a location by way of software using a radio wave environment corresponding to a cell coverage of a base station of a communication network, a handset-based mode using a global positioning system (GPS) receiver installed in the mobile communication terminal, and a hybrid mode in which the above two schemes are both used.

In order to measure a location using a wireless LAN radio signal (or radio signal), AP installation location information according to wireless LAN identification information is configured as a database. There, however, is no location information in the database for an area where an AP is newly installed or an area where the AP installed location is changed.

SUMMARY

In accordance with some embodiments, a device of estimating an access point (AP) location comprises an AP identification information extractor, an AP identification information identifier, a location determiner and a location estimator. The AP identification information extractor is configured to extract terminal AP identification information from a radio signal received from a terminal. The AP identification information identifier is configured to identify AP identification information corresponding to the extracted terminal AP identification information among information pre-stored in a database as first AP identification information, and identify AP identification information which does not correspond to the information pre-stored in the database among the extracted terminal AP identification information as second AP identification information. The location determiner is configured to determine location information of the terminal based on a latitude/longitude coordinate value assigned to each of the first AP identification information. The location estimator configured to determine the second AP identification information as new log data, and recognize the location information as location estimation information of the new log data.

In accordance with some embodiments, The AP location estimating device is configured to extract terminal AP identification information from a radio signal received from a terminal, identify AP identification information corresponding to the terminal AP identification information among information pre-stored in a database as first AP identification information, and identify AP identification information which does not correspond to the information pre-stored in the database among the terminal AP identification information as second AP identification information, determine location information of the terminal based on a latitude/longitude coordinate value assigned to each of the first AP identification information; and determine the second AP identification information as new log data, and recognizing the location information as location estimation information of the new log data.

In accordance with some embodiments, The AP location estimating device is configured to extract terminal AP identification information from a radio signal received from a terminal, identify AP identification information which does not correspond to information pre-stored in the database among the terminal AP identification information as new log data, and identify AP identification information corresponding to the terminal AP identification information among log data pre-stored through another terminal as third AP identification information; and select a weight value corresponding to each received signal strength range for the third AP identification information, and calculate location estimation information for the new log data based on each location information assigned to the third AP identification information and the weight value In accordance with some embodiments, the system for estimating an access point (AP) location comprises a database, a location calculating server, a positioning server and an AP location estimating device. The data base is configured to store lattice cells identified by a cell ID, wherein a wireless LAN radio signal is stored for each of the lattice cells. The location calculating server configured to receive satellite information and perform the positioning by using satellite data received from a terminal when the terminal 110 requests the positioning. The positioning server configured to measure a location of the target terminal by using the database for a wireless LAN based positioning. The AP location estimating device configured to extract terminal AP identification information from the wireless LAN radio signal received from a terminal, identify AP identification information which does not correspond to information pre-stored in the database among the terminal AP identification information as new log data, and identify AP identification information corresponding to the terminal AP identification information among log data pre-stored through another terminal as third AP identification information, select a weight value corresponding to each received signal strength range for the third AP identification information, and calculate location estimation information for the new log data based on each location information assigned to the third AP identification information and the weight value.

BRIEF DESCRIPTION OF THE DRAWINGS

FIG. 5 a schematic view of exemplary weight values corresponding to a received signal strength range according to at least one embodiment;

DETAILED DESCRIPTION

Figure 1:
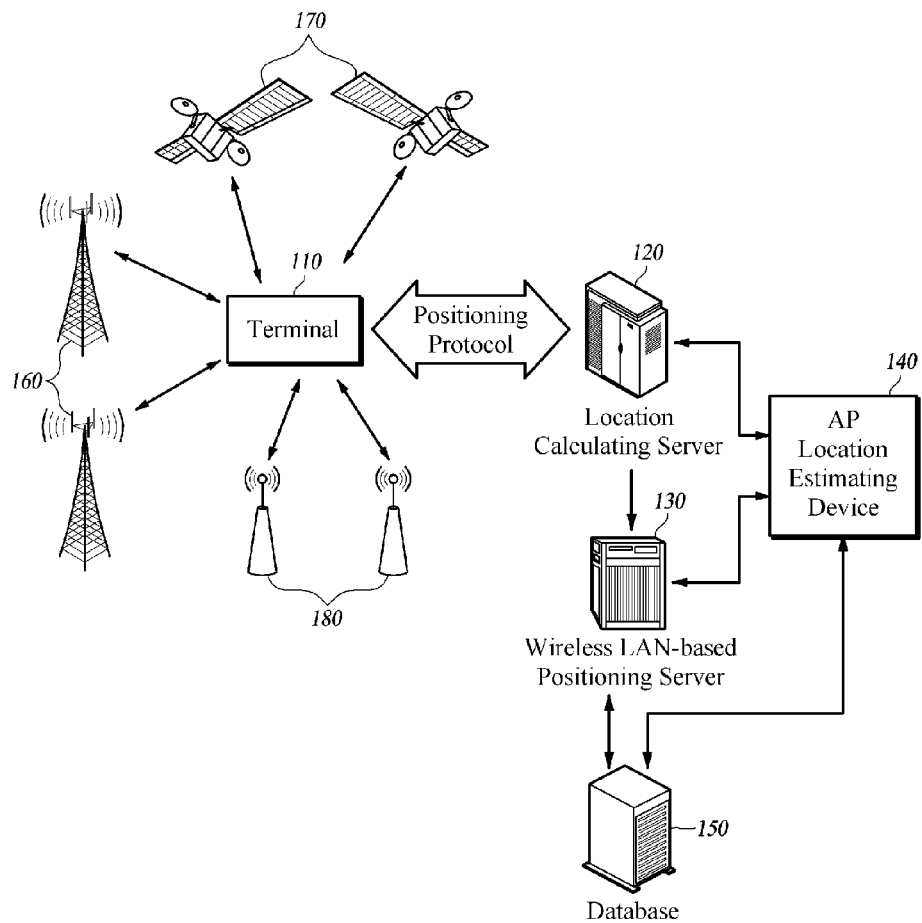
FIG. 1 is a block diagram of an access point (AP) location estimating system using log data according to at least one embodiment.

At least one embodiment of the present disclosure provides at least one AP location estimating method using log data which classifies information which is not pre-stored in a database (DB) when the database is updated, estimates location information of the at least one AP by using log data of a subscriber, and then matchingly stores the estimated location information, and a device and a system for the same.

Hereinafter, various embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a block diagram of an AP location estimating system using log data according to at least one embodiment.

The AP location estimating system using the log data is configured to include a terminal 110, a location calculating server 120, a wireless LAN based positioning server 130, an AP location estimating device 140, and a database 150. Meanwhile, although it is described that the AP location estimating system using the log data includes only the terminal 110, the location calculating server 120, the wireless LAN based positioning server 130, the AP location estimating device 140, and the database 150 in at least one embodiment of the present disclosure, it is only for an illustrative description of the technical idea according to an embodiment of the present disclosure, and those skilled in the art can variously change and modify the components included in the AP location estimating system using the log data and then apply the changed and modified components, without departing from the scope of the embodiment of the present disclosure.

The terminal 110 is configured to be equipped with a wireless communication module for performing general voice phone communication and data communication, and interwork with a communication network (not shown) by using the equipped wireless communication module, and perform the general voice phone communication and data communication through wireless communication. Meanwhile, the terminal 110 is configured to transmit information on a base station 160 of the interworking communication network to the location calculating server 120. Further, the terminal 110 can include a GPS module, but the present disclosure is not necessarily limited thereto. The terminal 110 is configure to extract navigation data from a GPS signal received from one or more Global Positioning System (GPS) satellites 170 by using the equipped GPS module and transmit the extracted navigation data to the location calculating server 120.

Further, the terminal 110 is configured to be equipped with a wireless LAN module, and access an Internet network through at least one Access Point (AP) 180 recognized from surroundings of the terminal 110 by using the equipped wireless LAN module to receive various types of web page data. Here, the AP 180 is configured to be a device for connecting data communication, and refer to a device which can read an address of a reception side from information included in data packet(s) transmitted by a transmission side, designate a most suitable communication path between the transmission side and the reception side base on the read address of the reception, and then transmit data packet(s) via the designated path in a communication network. That is, the AP 180 can be configured to extract destination information of the data packet(s), designate a communication path on a basis of the extracted destination information, and transmit the data packet(s) to a next device along the designated communication path, or can share several lines (or channels) in a network environment. In the at least one embodiment, the AP 180 may be used as a router, a repeater, a relay station, and a bridge.

That is, the terminal 110 is configured to include one or more of the wireless communication module, the GPS module, and the wireless LAN module, but the present disclosure is not necessarily limited thereto. The terminal 110 may be one of a mobile communication terminal, a smart phone, a personal computer (PC), a notebook, and a personal digital assistant (PDA) and the like, and refers to a terminal including a memory for storing an application to use a location based service, a microprocessor for executing a program to perform an operation and a control and the like.

The terminal 110 according to the at least one embodiment of the present disclosure may be implemented to include a database 150 for storing one or more lattice cells each identified by a cell ID, wherein a parameter of each of wireless LAN radio signals is stored for each of the lattice cells. Further, the terminal 110 is configured to extract terminal AP identification information from a wireless LAN radio signal (or radio signal) received from a particular AP, identify whether there is AP identification information corresponding to the extracted terminal AP identification information among information pre-stored in the database 150 as first AP identification information, identifies information which does not correspond to the information pre-stored in the database 150 among the terminal AP identification information as second AP identification information, determines current location information based on a latitude and longitude coordinate value assigned to each first AP identification information, determines the second AP identification information as new log data, and recognizes the current location information as location estimation information of the new log data. Meanwhile, the terminal 110 may be implemented to include the database, a terminal AP identification information extractor, a terminal AP identification information identifier, a terminal location determiner, and a terminal location estimator in order to estimate an AP location.

A positioning protocol refers to a protocol standardizing a standard of an application layer for measuring a location. The positioning protocol can use any positioning protocol as long as signal transmission/reception between the terminal 110 and the location calculating server 120 is possible. An Interim Standard-801 (IS-801), a Radio Resource Location Services Protocol (RRLP), a RRC (Radio Resource Control), a Secure User Plane Location (SUPL) and the like may be used as the positioning protocol. Meanwhile, a GPS signal and a wireless LAN signal may be together exchanged between the terminal 110 and the location calculating server 120 by using a Secure User Plane Location (SUPL) 2.0 as the positioning protocol, but the present disclosure is not necessarily limited thereto. Here, the SUPL refers to a technique aiming communication between respective nodes required when a conventional positioning procedure is performed by directly exchanging data related to the positioning between the terminal 110 and the location calculating server 120 through a communication network in providing the positioning, and corresponds a protocol for reducing costs spent on implementing the nodes required for the positioning and providing a more accurate positioning service. Meanwhile, when the SUPL 2.0 is used, the terminal 110 can measure a Round Trip Delay (RTD) by using the SUPL 2.0. That is, when the terminal 110 performs communication by using the wireless LAN signal and when the terminal 110 sets a wireless LAN parameter, a location ID and a location ID of a multiple location IDs are set, and the RTD including an RTD value, RTD units, and RTD accuracy may be measured by WLAN AP Info.

The location calculating server 120 is configured to receive satellite information through a self-constructed satellite reception device and perform the positioning by using the satellite data received from the terminal 110 when the terminal 110 requests the positioning. That is, the location calculating server 120 receives navigation data from the terminal 110 and performs calculating the latitude and longitude coordinates for the location on which the terminal 110 currently camps. Further, the location calculating server 120 is configured to transmit aiding data for helping the terminal 110 determine its currently camped-on location, and calculate a physical or logical distance between the GPS satellite 170 and the terminal 110. Moreover, when the location calculating server 120 selectively receives location information from the terminal 110 according to the need, the location calculating server 120 is configured to transmit the location information to a Location Based Service Platform (LBSP). The location calculating server 120 can transfer latitude and longitude data corresponding to positioning result data and Pilot Phase Measurement (hereinafter, referred to as "PPM") data received from the terminal 110 to a server for pCell positioning. The location calculating server 120 is configured to receive a positioning request signal (or location request) from the LBSP, and transmit to an HLR a Short Message Request (SMREQ) signal for requesting information on a terminal corresponding to a positioning target. The location calculating server 120 is configured to receive from the corresponding HLR a Short Message Request (SMREQ) signal containing a response to the request for the information on the terminal corresponding to the positioning target. The location calculating server 120 is configured to interwork with the terminal 110 to measure the location of the terminal 110, and then can transmit a positioning response signal (or location result) containing a positioning result to the LBSP.

Meanwhile, the location calculating server 120 includes a Position Determination Entity (hereinafter, referred to as a "PDE") applied to a synchronous Code Division Multiple Access (CDMA) system, a Position Server (PS) applied to an asynchronous Wideband Code Division Multiple Access (W-CDMA) system, and a Serving Mobile Location Center (SMLC) applied to a Global System for Mobile communication (GSM) system, but the present disclosure is not necessarily limited thereto. The PDE can execute a location measuring function using a satellite and a network type location measuring function using a triangulation method in the CDMA. Further, the PS can execute the location measuring function using the satellite and a basic cell type location measuring function in the W-CDMA, and the SMLC can execute the location measuring function using the satellite and the cell type location measuring function in the GSM.

Meanwhile, the above-mentioned PPM data contains system information measured by the terminal 110 and time and distance information of an adjacent base station. Here, basic data collected by the terminal 110 includes information on a system which is currently serviced, a pilot signal of the adjacent base station, signal intensity and the like. The information on the system which is currently serviced contains a system ID (hereinafter, referred to as an "SID"), a network ID (hereinafter, referred to as an "NID"), a base station ID (hereinafter, referred to as a "BSID"), a sector number of the base station which is currently serviced (Reference PN, hereinafter, referred to as "Ref_PN"), a pilot phase within the Ref_PN, a signal intensity and the like. Further, the pilot signal of the adjacent base station contains a sector number of the adjacent base station (measurement PN) collected from the mobile terminal 110, a pilot phase within the sector number of each adjacent base station, distance data and time data such as signal intensity. The above-mentioned PPM data is positioning related data in the CDMA system, and may be System Frame Number (SFN)-SFN observed time difference or UE RX-TX time difference data in the W-CDMA, but may be positioning related data used in other communication systems, not limited thereto.

Meanwhile, the location calculating server 120 can provide pCell based positioning. That is, the location calculating server 120 can measure a location of the terminal corresponding to a positioning target by using the database 150 for the pCell based positioning. When the location calculating server 120 receives a positioning request from the terminal 110, the location calculating server 120 selects a lattice cell (pCell) having the highest pattern matching with PPM data received from the terminal 110 from the constructed database 150, and provides a service requester with the selected lattice cell as a final positioning result. Here, in order to provide the service provider with an accurate positioning result, the database 150 should always maintain latest data (for example, a PN, a pilot phase, a signal strength and the like) which can better reflect a change in a positioning environment such as a wireless environment at a positioning request time, a positioning system state and the like.

Further, although it has been described that the location calculating server 120 is applied to the CDMA and the WCDMA to provide the Ipositioning, it is only for an illustrative description of the technical idea of the present disclosure, and those skilled in the art can make a modification such that the location calculation server 120 is applied to Long Term Evolution (LTE) and Evolved Packet Core (EPC) to provide the pCell positioning and then apply the modification, without departing from the scope of the present disclosure.

Although it is described that the AP location estimating device 140 and the location calculating server 120 are devices separated from each other, it is only for an illustrative description of the technical idea of the present disclosure, and those skilled in the art can make a modification so that the devices are implemented as one device and then apply the modification, without departing from the scope of the present disclosure.

The wireless LAN based positioning server 130 is configured to measure a location of the terminal 110 (e.g., a target terminal) by using the database 150 for a wireless LAN based positioning. When the wireless LAN based positioning server 130 receives from the terminal 110 a positioning request signal, including the wireless LAN radio signal, via the location calculation server 120, the wireless LAN based positioning server 130 is configured to select from the database 150 a lattice cell (pCell) having a pattern matching with the wireless LAN radio signal received from the terminal 110, and can provide a service requester (i.e., the terminal 110) with the selected lattice cell as a positioning result. That is, the wireless LAN based positioning server 130 is configured to identify AP identification information included in the wireless LAN signal, select from the database 150 a lattice cell corresponding to the same AP identification information stored in the database 150 or matching to the AP identification information included in the wireless LAN signal received from the terminal 110. And if the wireless LAN based positioning server 130 searches (or determines) AP identification information, pre-stored in the database 150, matching to the AP identification information from the terminal 110, the wireless LAN based positioning server 130 is configured to provide the terminal 110 with information related to the selected lattice cell as a positioning result. Here, the wireless LAN based positioning server 130 can measure the location of the terminal 110 by using one or more of information on a physical or logical distance between APs recognized by the terminal 110, information on a reception signal intensity of the wireless LAN signal, deviation value information, level information, and a score according to the deviation information.

Further, the wireless LAN based positioning server 130 selects lattice cells having the AP identification information included in the wireless LAN information received from the terminal 110 by searching or retrieving the database 150, and compares information matched with the selected lattice cells with pre-stored information by using the information pre-stored in the database 150 to thereby calculate information on a physical or logical distance between APs for relaying the wireless LAN signal. When the calculated physical or logical distance exceeds a preset distance, the lattice cell including the corresponding AP identification information may be excluded from the positioning target by the wireless LAN based positioning server 130. Alternatively, the wireless LAN based positioning server 130 is configured to assign points differently applied in an order of the reception signal intensity to the AP identification information included in the selected lattice cell, and can determine the location of the terminal 110 by using a final value generated by summing the assigned points.

The AP location estimating device 140 according to the at least one embodiment is configured to extract terminal AP identification information from a wireless LAN radio signal received from a terminal. Here, the terminal AP identification information indicates AP identification information included in the wireless LAN radio signal received from a terminal and includes one or more information of a MAC address of the AP relaying the wireless LAN signal, received signal strength for each MAC address, a Service Set Identifier (SSID), AP channel information, and AP frequency information. Meanwhile, when the AP location estimating device 140 receives a GPS positioning signal from the terminal 110, the AP location estimating device 140 is configured to recognize a latitude/longitude coordinate value corresponding to the GPS positioning signal as location measurement information for new log data. For example, when the terminal 110 makes a request for GPS based positioning by using its equipped GPS module, and successfully achieves the GPS positioning (e.g., a probability of success in the GPS positioning is 25%), the AP location estimating device 140 is configured to recognize a corresponding latitude/longitude coordinate value as location measurement information for new log data through successfully achieving the GPS positioning. On the other hand, when failure in the GPS positioning (e.g., a probability of failure in the GPS positioning is 75%) is occurred for the GPS positioning, the AP location estimating device 140 is configured to extract the terminal AP identification information from the received wireless LAN radio signal and thus estimate the location information to be used for the new log data by using the extracted terminal AP identification. That is, the AP location estimating device 140 can estimate a location of unknown AP(s) failed to recognize in the wireless LAN based positioning using the received wireless LAN radio signal.

The AP location estimating device 140 identifies AP identification information corresponding to information pre-stored in the database 150 among the extracted terminal AP identification information as first AP identification information, and identifies information which does not correspond to the information pre-stored in the database 150 among the extracted terminal AP identification information as second AP identification information.

The AP location estimating device 140 is configured to determine location information of the terminal 100 based on a latitude/longitude coordinate value assigned to each of the first AP identification information. That is, the AP location estimating device 140 is configured determine an average value of latitude/longitude coordinate values assigned to respective first AP identification information as the location information of the terminal 110. Meanwhile, the AP location estimating device 140 is configured to determine the location information of the terminal 110 based on a latitude/longitude coordinate value assigned to a lattice cell having the first AP identification information. Here, the latitude/longitude coordinate value assigned to the lattice cell having the first AP identification information refers to a coordinate value of a center in the corresponding lattice cell.

The AP location estimating device 140 is configured to determine the second AP identification information as new log data, and recognize location information as location estimation information for the new log data. The AP location estimating device 140 is configured to compare the new log data with log data pre-stored through another terminal whereby if there are some AP identification information matching to each other between the new log data and log data pre-stored through another terminal, the AP location estimating device 140 is configured to collect the matched AP identification information. The AP location estimating device 140 is configured to identify the collected AP identification as third AP identification information. Here, the pre-stored log data includes one or more of MAC address information, SSID information, Received Signal Strength Indication (RSSI), and latitude/longitude coordinate value information of the MAC address. The AP location estimating device 140 may be configured to select AP identification information having RSSI equal to or larger than a preset threshold from the third AP identification information.

The AP location estimating device 140 is configured to differentially assign (or select) a weight value depending on a signal strength range of each received wireless LAN radio signal associated with the third AP identification information. The AP location estimating device 140 is configured recognize location information, which is obtained based on each location information and the weight value both of which are assigned to the third AP identification information, as location estimation information for the new log data. Here, the weight value is matched by the AP location estimating device 140 with a particular value preset according the received signal strength indication in such a manner where the larger the received signal strength is, the larger weight value the preset particular value has. The AP location estimating device 140 is configured to calculate an average coordinate value of all differential weight values generated by multiplying each location information assigned to the third AP identification information and each assigned weight value, and recognizes the average coordinate value of all differential weight values as the precise location estimation information for the new log data. Here, a process of calculating an average X coordinate value and an average Y coordinate value is expressed as defined in Equation 1.

$$X coordinate value = \frac{x1 \times R1 \ldots + xn \times Rn}{R1 \ldots + Rn}$$
$$Y coordinate value = \frac{y1 \times R1 \ldots + yn \times Rn}{R1 \ldots + Rn}$$

Equation 1

(x: X coordinate value corresponding to latitude in location information of at least one AP indicated by the third AP identification information, y: Y coordinate value corresponding to longitude in location information of at least one AP indicated by third AP identification information, R1~Rn: weight value respectively assigned to at least one AP indicated by third AP identification information). The location estimator 240 of the AP location estimating device 140 is configured to calculate X coordinate value and Y coordinate value for the new log data by using the Equation 1.

The AP location estimating device 140 is configured to calculate a weight average X coordinate value by multiplying each X coordinate value of the location information assigned to each of the third AP identification information by each assigned weight value, doing the sum of all the products of the multiplications (i.e., x1×R1+ . . . +xn×Rn), and then dividing the sum of all the products of the multiplications by a sum of all the weight values (R1+ . . . +Rn). The AP location estimating device 140 is configured to calculate a weight average Y coordinate value by multiplying each Y coordinate value of the location information assigned to each of the third AP identification information by each assigned weight value, doing the sum of all the products of the multiplications (i.e., y1×R1+ . . . +yn×Rn) and then dividing the sum of all the products of the multiplications by a sum of all the weight values (R1+ . . . +Rn). The AP location estimating device 140 is configured to recognize the right average coordinate value (the weight average X coordinate value and the average Y coordinate value) as the location estimation information for the new log data.

Other methods/formulas for calculating the location estimation information for the new log data based on the X and Y coordinates are within the scope of various embodiments. For example, The AP location estimating device 140 may be configured to select AP identification information having RSSI equal to or larger than a preset threshold from the third AP identification information. In this case, the AP location estimating device 140 calculates the weight average coordinate value by multiplying the selected information by the weight value which is respectively assigned to the selected information, and recognizes the weight average coordinate value as the location estimation information for the new log data. The AP location estimating device 140 calculates the weight average X coordinate value by multiplying the selected information by the weight value and then dividing a sum of products of the multiplications by a sum of the weight values corresponding to the selected information, calculates the weight average Y coordinate value by multiplying the selected information by the weight value and then dividing a sum of products of the multiplications by a sum of the weight values corresponding to the selected information, and collects the weight average X coordinate value and the weight average Y coordinate value to recognize the weight average coordinate value.

Although it is described that the database 150 is implemented as a device separated from the location calculating server 120 or the AP location estimating device 140, the present disclosure is not necessarily limited thereto and the database 150 may be included within the location calculating server 120 or the AP location estimating device 140. In some embodiments, the terminal 110, the location calculating server 120, the wireless LAN based positioning server 130, and/or the AP location estimating device 140 include(s) one or more network interfaces including, but not limited to, cellular, Wi-Fi, LAN, WAN, CDMA, WCDMA, GSM, LTE and EPC networks, and cloud computing networks. Each of the terminal 110, the location calculating server 120, the wireless LAN based positioning server 130, and the AP location estimating device 140 is implemented by one or more processors and/or application-specific integrated circuits (ASICs).

The database 150 is configured to store positioning result data which is a positioning result measured every time as reference data and stores lattice cells identified by the pCell ID, wherein a parameter of the wireless LAN radio signal is stored for each of the lattice cells. That is, the database 150 is configured to divide a location measurement service target area by the unit of one or more lattices having a predetermined size, defines each lattice as a pCell, and then configures a DB storing the positioning result for each defined pCell and wireless LAN environment information. Here, the wireless LAN radio signal includes at least one of a Wi-Fi signal, a WiMax signal, Delivery Traffic Indication Message (DTIM), and a hot spot signal.

Here, the lattice cell is a cell divided from a particular area to have a preset size, and includes a base station sector number of a base station positioned in the particular area and a pCell ID based on a PSC (Primary Scrambling Code). That is, the lattice cell may be set to have an N×M size. For example, the lattice cell may be set to have a square shape of 100×100, 50×50, 30×30, 25×25, 20×20, 10×10.5×5, 1×1 and the like, but the present disclosure is not necessarily limited thereto and the lattice cell may be set to have various shapes suitable for each environment through an optimization process in the future. Further, the database 150 in FIG. 1 basically includes information on a system which is currently serviced, a pilot signal of the adjacent base station, signal intensity and the like. The information on the system which is currently serviced contains a system ID (hereinafter, referred to as an "SID"), a network ID (hereinafter, referred to as an "NID"), a base station ID (hereinafter, referred to as a "BSID"), a sector number of the base station which is currently serviced (Reference PN, hereinafter, referred to as "Ref_PN"), a pilot phase within the Ref_PN, a signal intensity and the like.

In a detailed description of pCell positioning type data stored in the database 150 in detail, the database 150 stores reference data which can represent the basic data, together with the lattice cells distinguished by each pCell ID with positioning result data which is the positioning result measured every time as the basic data. Here, the reference data is data compared when the pattern matching is considered in the pCell positioning. The reference data highly influences positioning accuracy and is updated when the database is updated. In general, in order to update the database, the reference data is updated by calculating an arithmetic average of newly measured positioning result data and a large amount of already stored basic data. Due to such a data update manner, the newly measured positioning result data may be slightly reflected to the reference data. Particularly, when the amount of basic data already stored in the database is great large, the newly measured positioning result data hardly influences the update of the reference data although the database is updated.

In order to enable the positioning method to provide a more accurate positioning result, the database should be always updated to maintain the latest data. However, due to characteristics of the above-mentioned data updating scheme in a general positioning scheme, a general database update method in the general positioning method may not sufficiently reflect a change in a positioning environment such as a wireless environment, a positioning system state and the like. For example, in a condition where a positioning system or a wireless environment in which the positioning service is executed is continuously and frequently changed, currently measured positioning result data can provide a more accurate positioning result in comparison with the reference data pre-stored in the database in the past. In this event, the reference data stored in the database may adaptively follow the condition where the current positioning environment is changed, by reflecting the currently measured positioning result data with a higher level when the reference data pre-stored in the database is updated.

Meanwhile, in a detailed description of the wireless LAN signal stored in the database 150 according to the embodiment of the present disclosure, the database 150 stores the wireless LAN environment information for each of the lattice cells identified by each pCell ID. Here, the wireless LAN environment information refers to information by which APs for relaying the wireless LAN signal can be identified, and preferably is a MAC address of the AP for relaying the wireless LAN signal but not necessarily limited thereto. Here, the MAC address of the AP is unique information by which the corresponding AP can be identified, and corresponds to the Basic Service Set Identifier (BSSID). The MAC address is assigned a total of 48 bits, and information assigned by a manufacturer is input to 24 bits of the 48 bits. The Service Set Identifier (SSID) is also information by which the corresponding AP can be identified, and indicates a value set by a user. Further, the database 150 according to the embodiment of the present disclosure stores a location according to base station identification information. Here, it is preferable that the base station identification information is the base station sector number, but not necessarily limited thereto.

The database 150 refers to a general data structure implemented in a storage space (hard disk or a memory) by using a database management program (or Database Management System: DBMS), and a data storage type in which searching (extraction), deletion, editing, addition and the like of the data are freely performed. The database 150 may be implemented to serve a purpose according to the embodiment of the present disclosure by using a Relational Database Management System (RDBMS) such as Oracle, Infomix, Sybase, and DB2, an Object Oriented Database Management System (OODBMS) such as Gemston, Orion, O2 and the like, and an XML native database such as Excelon, Tamino, Sekaiju and the like, and has proper fields or elements to achieve the function.

Figure 2:
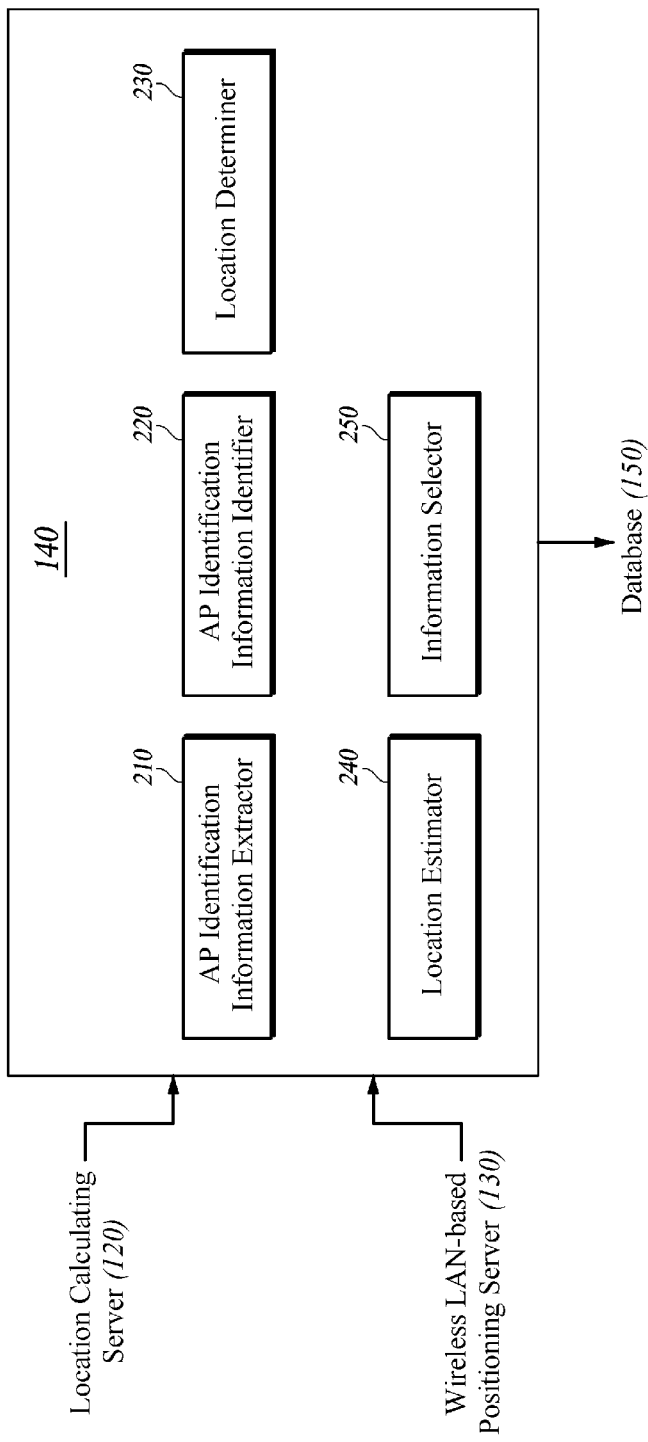
FIG. 2 is a block diagram of an AP location estimating device according to at least one embodiment.

FIG. 2 is a block diagram of the AP location estimating device according to at least one embodiment.

The AP location estimating device 140 is configured to include an AP identification information extractor 210, an AP identification information identifier 220, a location determiner 230, a location estimator 240, and an information selector 250. Meanwhile, although it is described that the AP location estimating device 140 includes only the AP identification information extractor 210, the AP identification information identifier 220, the location determiner 230, the location estimator 240, and the information selector in an embodiment of the present disclosure, it is only for an illustrative description of the technical idea of the embodiment of the present disclosure and those skilled in the art can variously change and modify the components included in the AP location estimating device 140 and then apply the changed and modified components, without departing from the scope of the embodiment of the present disclosure. Other components of the AP location estimating device 140, such as the AP identification information extractor 210, the AP identification information identifier 220, the location determiner 230, the location estimator 240, and the information selector 250, are implemented by one or more processors and/or application-specific integrated circuits (ASICs).

The AP identification information extractor 210 is configured to extract terminal AP identification information from a wireless LAN radio signal received from a terminal. Here, the terminal AP identification information includes one or more of a MAC address of the AP relaying the wireless LAN signal, received signal strength for each MAC address, a Service Set Identifier (SSID), AP channel information, and AP frequency information. Meanwhile, when the AP identification information extractor 210 is configured to receive a GPS positioning signal from the terminal, the AP identification information extractor 210 is configured to recognize a latitude/longitude coordinate value corresponding to the GPS positioning signal as location measurement information for new log data.

The AP identification information identifier 220 is configured to identify AP identification information corresponding to the terminal AP identification information among information pre-stored in the database 150 as first AP identification information, and identifies information which does not correspond to the information pre-stored in the database 150 among the terminal AP identification information as second AP identification information. The location determiner 230 is configured to determine location information of the terminal based on a latitude/longitude coordinate value assigned to each first AP.identification information. That is, the location determiner 230 is configured to determine an average value of latitude/longitude coordinate values assigned to respective first AP identification information as the location information of the terminal. Meanwhile, the location determiner 230 is configured to determine a latitude/longitude coordinate value assigned to a lattice cell having the first AP identification information identified through the AP identification information is configured to identify 220 as the location information of the terminal. Here, the latitude/longitude coordinate value assigned to the lattice cell having the first AP identification information refers to a center coordinate value of the corresponding lattice cell. The AP identification information identifier 220 is configured to compare the new log data with log data pre-stored through another terminal and collects AP identification information pieces, which correspond to each other, to identify third AP identification information. Here, the pre-stored log data includes one or more information of MAC address information, SSID information, Received Signal Strength Indication (RSSI), and latitude/longitude coordinate value information of the MAC address.

The location estimator 240 is configured to determine the second AP identification information as the new log data, and recognizes the location information as the location estimation information for the new log data. The location estimator 240 is configured to select a weight value corresponding to each received signal strength range for the third AP identification information, and recognizes the location information calculated based on each location information and weight value assigned to the third AP identification information as precise location estimation information for the new log data. The location estimator 240 is configured to select the weight value corresponding to each received signal strength range for the third AP identification information, and recognizes the location information calculated based on each location information and weight value assigned to the third AP identification information as precise location estimation information for the new log data. Here, the weight value is matched with a particular value preset according the received signal strength indication, and the preset particular value has a larger weight value as the received signal strength is larger. The location estimator 240 is configured to calculate an average coordinate value of all weight values generated by multiplying each piece of location information assigned to the third AP identification information and the weight value, and recognizes the average coordinate value of all weight values as the precise location estimation information for the new log data.

The location estimator 240 is configured to calculate a weight average X coordinate value by multiplying each X coordinate value of the location information assigned to the third AP identification information identified through the AP identification information identifier 220 by the weight value and then dividing a sum of products of the multiplications by a sum of all the weight values, calculates a weight average Y coordinate value by multiplying each Y coordinate value of the location information assigned to the third AP identification information by the weight value and then dividing a sum of products of the multiplications by a sum of all the weight values, and collects the average X coordinate value and the average Y coordinate value to recognize the average coordinate value of all weight values. The location estimator 240 calculates the weight average coordinate value by multiplying the selected information and the weight value, and recognizes the weight average coordinate value as the precise location estimation information for the new log data.

The location estimator 240 is configured to calculate the weight average X coordinate value by multiplying the selected information by the weight value and then dividing a sum of products of the multiplications by a sum of all the weight values corresponding to the selected information, calculate the weight average Y coordinate value by multiplying the selected information by the weight value and then dividing a sum of products of the multiplications by a sum of all the weight values corresponding to the selected information, and collect the weight average X coordinate value and the weight average Y coordinate value to recognize the weight average coordinate value.

Figure 3:
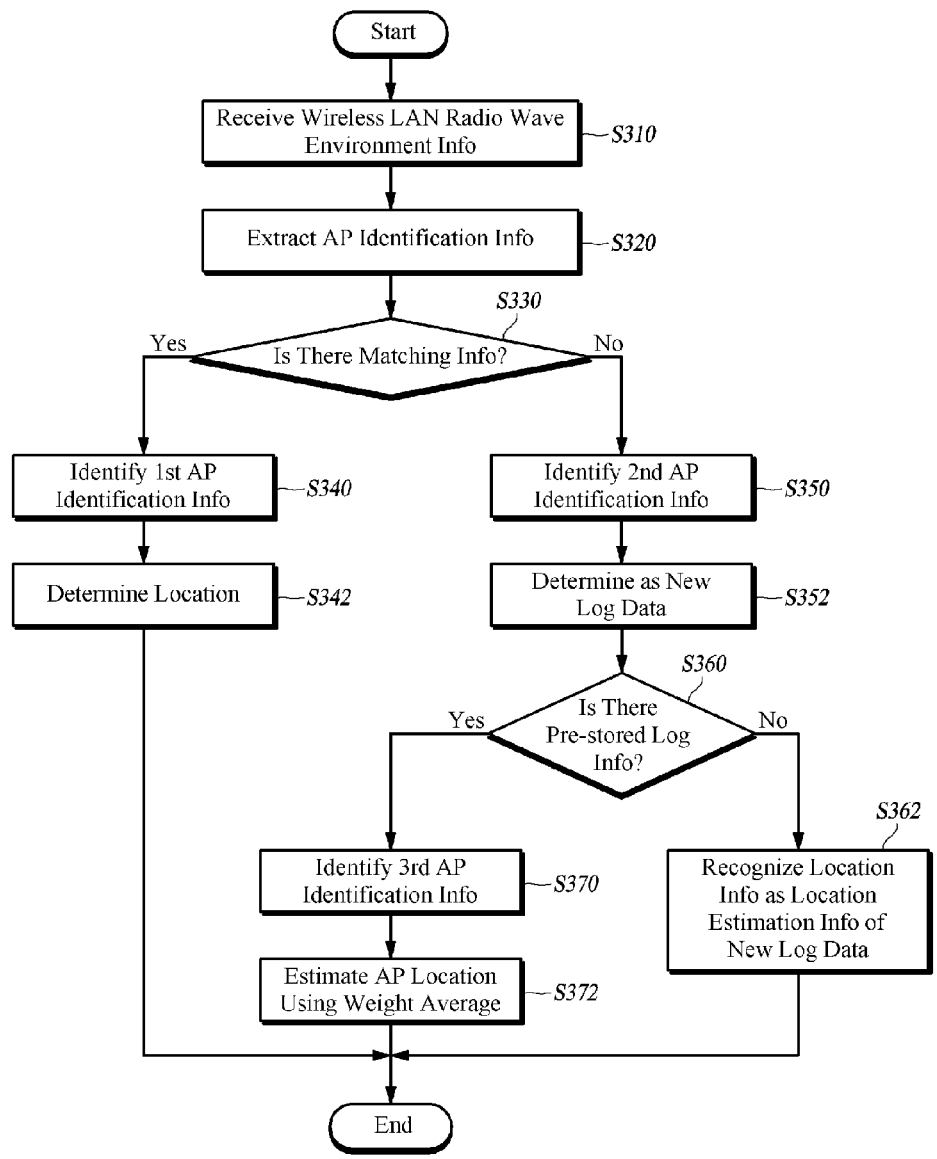
FIG. 3 is a flowchart of an AP location estimating method using log data according to at least one embodiment.

FIG. 3 is a flowchart of an AP location estimating method using log data according to at least one embodiment.

The AP location estimating device 140 receives a wireless LAN radio signal from the terminal 110 via the location calculating server 120 or the wireless LAN based positioning server 130 in step S310. The AP location estimating device 140 extracts terminal AP identification information from the wireless LAN radio signal received from the terminal in step S320. Here, the AP identification includes one or more of a MAC address of the AP relaying the wireless LAN radio signal, received signal strength for each MAC address, a Service Set Identifier (SSID), AP channel information, and AP frequency information. Meanwhile, when the AP location estimating device 140 receives a GPS positioning signal from the terminal 110, the AP location estimating device 140 can recognize a latitude/longitude coordinate value corresponding to the GPS positioning signal as positioning information for new log data.

The AP location estimating device 140 identifies whether there is information corresponding to the terminal AP identification information among information pre-stored in the database 150 in step S330. As a result of the identification of step S330, when there is the information corresponding to the terminal AP identification information among the information pre-stored in the database 150, the AP location estimating device 140 identifies among the information pre-stored in the database 150 the AP identification information corresponding to the terminal AP identification information as first AP identification information in step S340. Meanwhile, the AP location estimating device 140 may identify the terminal AP identification information extracted from the received wireless LAN radio signal as the first AP identification information. The AP location estimating device 140 determines location of the terminal based on a latitude/longitude coordinate value assigned to each first AP identification information in step S342. That is, the AP location estimating device 140 determines an average value of latitude/longitude coordinate values assigned to respective first AP identification information as the location information of the terminal. Meanwhile, AP location estimating device 140 determines a latitude/longitude coordinate value assigned to a lattice cell having the first AP identification information identified through the AP identification information identifier 220 as the location information of the terminal. Here, the latitude/longitude coordinate value assigned to the lattice cell having the first AP identification information refers to a coordinate value of center on the corresponding lattice cell.

Meanwhile, as a result of the identification of step S330, when there is no information corresponding to the AP identification information among the information pre-stored in the database 150, the AP location estimating device 140 identifies the information which does not correspond to the information pre-stored in the database 150 among the terminal AP identification information second identification information in step S350. The AP location estimating device 140 determines the second AP identification information as new log data in step S352. Meanwhile, when the AP location estimating device 140 determines the second AP identification information as the new log data through step S352, the AP location estimating device 140 can insert the second AP identification information in a lattice cell having the first AP identification information determined through step S342. That is, when the AP location estimating device 140 determines the second AP identification information as the new log data, the latitude/longitude coordinate value assigned to the lattice cell having the first AP identification information is matchingly stored for the second AP identification information.

The AP location estimating device 140 identifies whether there is log data pre-stored in the database 150 through another terminal in order to calculate location estimation information for the new log data in step S360. As a result of the identification of step S360, when there is no information pre-stored in the database 150 through another terminal, the AP location estimating device 140 recognizes location information determined based on the first AP identification information as the location estimation information for the new log data in step S362. That is, since the AP location estimating device 140 determines the latitude/longitude coordinate value assigned to the lattice cell having the first AP identification information identified through the AP identification information identifier 220 as the location information of the terminal, the AP location estimating device 140 estimates that a location of the second AP identification information included in the AP identification information is similar to a location of the first AP identification information and recognizes the determined location information of the first AP identification information as the location estimation information for the new log data to store the location information in the database 150.

Meanwhile, as a result of the identification of step S360, when there is the log information pre-stored in the database 150 through another terminal, the AP location estimating device 140 compares the new log data with log data pre-stored through another terminal and collects AP identification information pieces which correspond to each other, to identify third AP identification information in step S370. Here, the pre-stored log data includes at least one of MAC address information of at least one AP, SSID information, received signal strength indication, and latitude/longitude coordinate information of the MAC address.

The AP location estimating device 140 selects a weight value corresponding to each received signal strength range of the third AP identification information, and recognizes location information obtained based on each location information and weight value assigned to the third AP identification information as precise location estimation information for the new log data in step S372. Here, the weight value is matched with a particular value preset according the received signal strength indication, and the preset particular value has a larger weight value as the received signal strength is larger.

In a detailed description of step S372, the AP location estimating device 140 can calculate an average coordinate value of all weight values and a weight average coordinate value using information having a received signal strength indication equal to or larger than a preset threshold corresponding to a particular signal strength based on the each location information and weight value assigned to each of the third AP identification information, which will be described in detail below.

The AP location estimating device 140 calculates a weight average coordinate value for all weight values by multiplying each location information assigned to each of the third AP identification information by each assigned weight value, and recognizes the calculated weight average coordinate value for all weight values as the precise location estimation information for the new log data. The AP location estimating device 140 calculates a weight average X coordinate value by multiplying each X coordinate value of the location information assigned to each of the third AP identification information by each assigned weight value, doing the sum of all the products of the multiplications (i.e., $x1 \times R1 + \ldots + xn \times Rn$), and then dividing the sum of all the products of the multiplications by a sum of all the weight values ($R1 + \ldots + Rn$). The AP location estimating device 140 calculates a weight average Y coordinate value by multiplying each Y coordinate value of the location information assigned to each of the third AP identification information by each assigned weight value, doing the sum of all the products of the multiplications (i.e., $y1 \times R1 + \ldots + yn \times Rn$), and then dividing the sum of the products of the multiplications by a sum of all the weight values ($R1 + \ldots + Rn$). And the AP location estimating device 140 collects the average X coordinate value and the average Y coordinate value to thusly recognize the collected result as a weight average coordinate value.

Meanwhile, the AP location estimating device 140 selects information having the received signal strength indication equal to or larger than a preset threshold from the third AP identification information. The AP location estimating device 140 calculates the weight average coordinate value by multiplying the selected information by the weight value, and recognizes the weight average coordinate value as the precise location estimation information for the new log data.

Although it is described that steps S310 to step S372 are sequentially performed in FIG. 3, it is only for an illustrative description of the technical idea according to an embodiment of the present disclosure, and those skilled in the art can apply various modifications and changes by modifying and then executing the order described in FIG. 3 or executing one or more of steps S310 to S372 in parallel without departing from the scope of an embodiment of the present disclosure, so that FIG. 3 of the present disclosure is not limited to a time-series order.

As described above, the AP location estimating method according to an embodiment of the present disclosure described in FIG. 3 may be recorded in any non-transitory, a computer-readable recording medium implemented in the form of one or more programs. A computer-readable recording medium for recording a program for implementing the AP location estimating method according to at least one embodiment of the present disclosure includes all types of recording devices for storing data readable by a computer system. An example of the computer-readable recording medium includes a ROM, a RAM, a CD-ROM, a magnetic tape, a floppy disk, an optical data storage device and the like. Further, the computer-readable recording medium may be distributed over the computer systems connected via network to store and execute a code readable by the computer in a distributed manner. In addition, a functional program, a code, code segments for implementing an embodiment of the present disclosure may be easily deduced by programmers skilled in the art.

Figure 4:
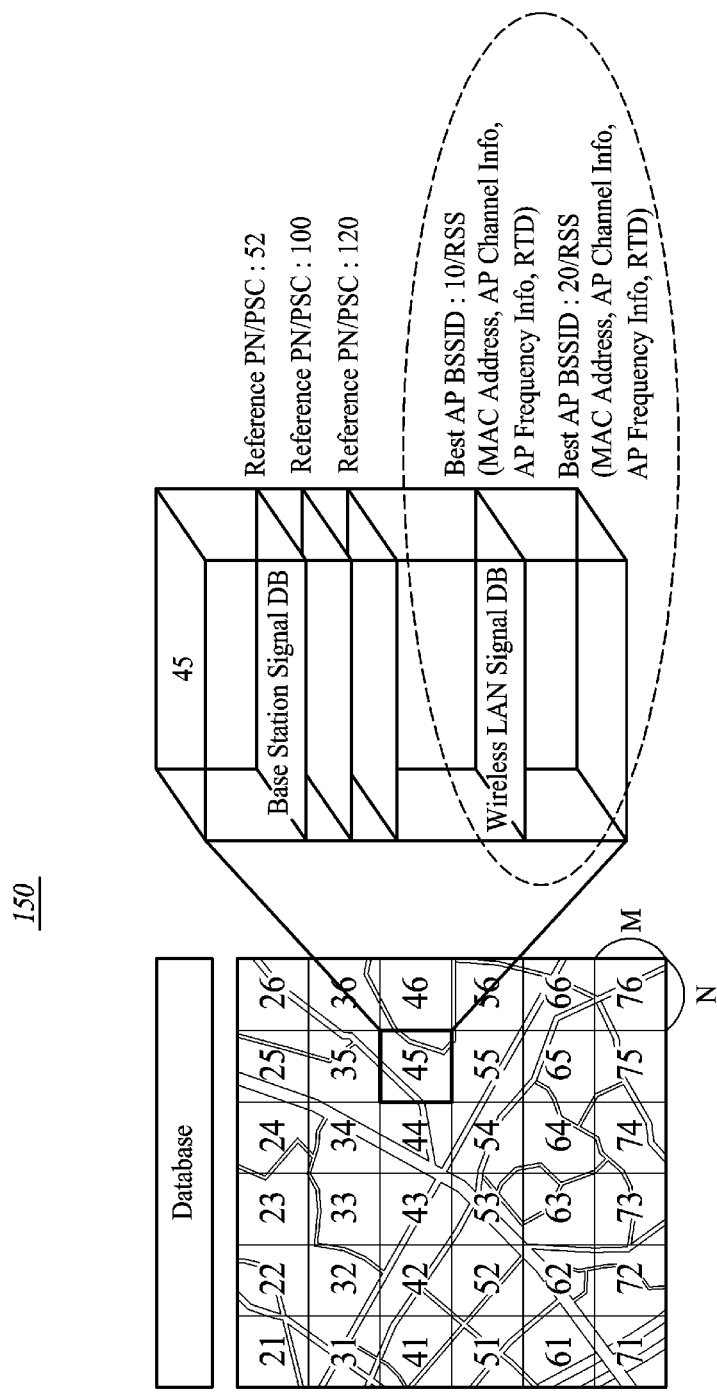
FIG. 4 is a schematic view of a exemplary database structure of one lattice cell among lattice cells according to at least one embodiment.

FIG. 4 is a schematic view of a exemplary database structure of one lattice cell among lattice cells according to at least one embodiment.

The database 150 illustrated in FIG. 4 is configured as a database for dividing a location measurement service target area by the unit of lattice cells having a predetermined size and storing a wireless LAN radio wave environment collected for each lattice cell. The lattice cell illustrated in FIG. 4 is a cell divided from a particular area to have a preset size. That is, the lattice cell may be set to have a square shape of $100 \times 100$, $50 \times 50$, $30 \times 30$, $25 \times 25$, $20 \times 20$, $10 \times 10$, $5 \times 5$, $1 \times 1$ and the like, but the present disclosure is not necessarily limited thereto and the lattice cell may be set to have various shapes suitable for each environment through an optimization process in the future.

Further, the database 150 matchingly stores identification information of the AP transmitting/receiving the wireless LAN signal, MAC address information, a received signal strength indication, frequency information, and location estimation information of the AP in each distinguished lattice cell as illustrated in FIG. 4. When the database 150 obtains one or more of latitude information longitude information, and altitude information corresponding to accurate location information on a location where the AP is installed through an external server, the database 150 surely can update the location estimation information of the AP to the accurate location information on the location where the AP installed.

The database 150 refers to a general data structure implemented in a storage space (hard disk or a memory) by using a database management program (or Database Management System: DBMS), and a data storage type in which search (extraction), deletion, editing, addition and the like of the data are freely performed. The database 160 may be implemented to serve the purpose according to the embodiment of the present disclosure by using a Relational Database Management System (RDBMS) such as Oracle, Infomix, Sybase, and DB2, an Object Oriented Database Management System (OODBMS) such as Gemston, Orion, O2 and the like, and an XML native database such as Excelon, Tamino, Sekaiju and the like, and has proper fields or elements to achieve the function.

FIG. 5 a schematic view of exemplary weight values corresponding to the received signal strength range according to at least one embodiment.

The AP location estimating device 140 selects the weight value corresponding to the received signal strength range. Here, the weight value is matched with a particular value preset according the received signal strength indication, and the preset particular value has a larger weight value as the received signal strength is larger, but the present disclosure is not necessarily limited thereto. At this time, the weight value corresponding to the received signal strength range is as illustrated in FIG. 5. Here, an actual received signal strength is "–00 dBm", but the received signal strength is expressed in a range from –10 to –90 in figures in the present disclosure for convenience of the description.

In a detailed description, for example, a preset weight value is "W1" when the received signal strength is "from –10 to 19", and the preset weight value is "W2" when the received signal strength is "from –20 to 29", the preset weight value is "W3" when the received signal strength is "from –30 to 39", the preset weight value is "W4" when the received signal strength is "from –40 to 49", the preset weight value is "W5" when the received signal strength is "from –50 to 59", the preset weight value is "W6" when the received signal strength is "from –60 to 69", the preset weight value is "W7" when the received signal strength is "from –70 to 79", the preset weight value is "W8" when the received signal strength is "from –80 to 89", and the preset weight value is "W9" when the received signal strength is "from –90 to 99". The received signal strength ranges and the weight values illustrated in FIG. 5 are only for an illustrative description of the technical idea of the present disclosure, and those skilled in the art can make various modifications and changes, without departing from the scope of the present disclosure. Here, examples reflecting the weight values corresponding to the received signal strength ranges will be described in detail with reference to FIG. 7.

Figure 6:
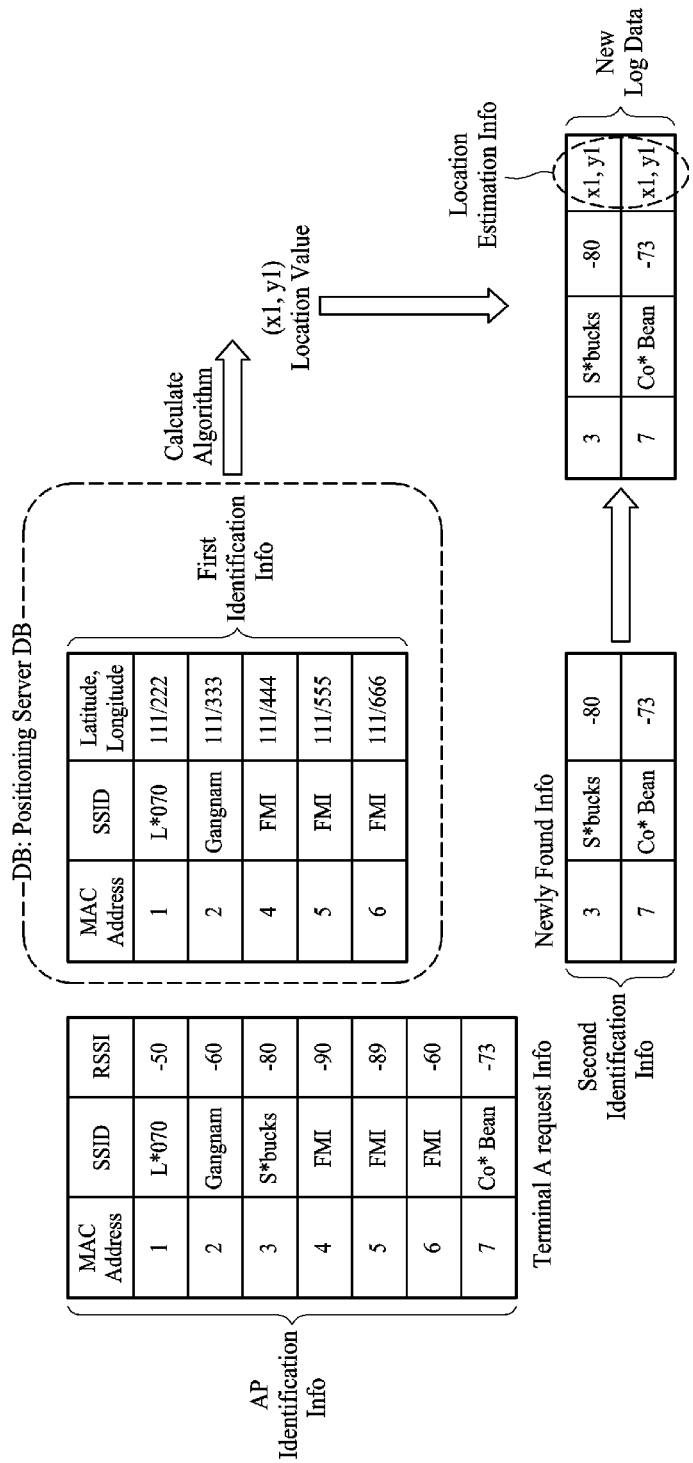
FIG. 6 a schematic view of examples of first AP identification information, second AP identification information, new log data, and location estimation information according to at least one embodiment.

FIG. 6 a schematic view of examples of first AP identification information, second AP identification information, new log data, and location estimation information according to at least one embodiment.

The AP location estimating device 140 extracts terminal AP identification information from a wireless LAN radio signal received from a "terminal A" which is a particular terminal. Here, the terminal AP identification information includes one or more information of a MAC address of the AP relaying the wireless LAN signal, a received signal strength for each MAC address, a Service Set Identifier (SSID), AP channel information, and AP frequency information, but it is assumed and described that the terminal AP identification information includes only the MAC address, the SSID, and the received signal strength for convenience of the description, as illustrated in FIG. 6. Further, it is assumed and described that the MAC address illustrated in FIG. 6 is from "1" to "7" for convenience of the description. For example, the AP location estimating device 140 receives the wireless LAN radio signal from the "terminal A", and extracts the terminal AP identification information from the received wireless LAN radio signal. At this time, as illustrated in FIG. 6, a total of seven information pieces such as "L*070", "Gangnam", "S*bucks", "FMI", and "Co*Bean" may be extracted as the SSIDs included in the AP identification information.

When there is information corresponding to AP identification information among information pre-stored in the database 150, the AP location estimating device 140 identifies the AP identification information as first AP identification information and identifies information which does not correspond to the AP identification information among the information pre-stored in the database 150 as second AP identification information. For example, the AP location estimating device 140 identifies whether there is information corresponding to the information pre-stored in the database 150 in the AP identification information including a total of seven MAC addresses of which the SSIDs are "L*070", "Gangnam", "S*bucks", "FMI", and "Co*Bean", and identifies information corresponding to the information pre-stored in the database 150 as the first AP identification information based on a result of the identification. That is, since MAC addresses of "1", "2", "4", "5", and "6" of the seven MAC addresses correspond to the AP identification information among the information pre-stored in the database 150, the five MAC addresses are identified as the first AP identification information, and a latitude/longitude coordinate value, which is calculated by using an algorithm, assigned to a lattice cell having the first AP identification information is determined as (x1, y1) which is location information of the "terminal A" corresponding to the terminal. Here, the latitude/longitude coordinate value assigned to the lattice cell having the first AP identification information refers to a center coordinate value of the corresponding lattice cell.

Meanwhile, since MAC addresses of "3" and "7" of the seven MAC addresses do not correspond to the AP identification information among the information pre-stored in the database 150, the two MAC addresses are identified as the second AP identification information, and the second AP identification information is determined as new log data. At this time, since the AP location estimating device 140 determines the latitude/longitude coordinate value assigned to the lattice cell having the first AP identification information as (x1, y1), the AP location estimating device 140 recognizes the determined location information (x1, y1) as location estimation information for the new log data, and matchingly stores the location estimation information in the database 150. That is, since the seven MAC addresses included in the AP identification information are contained in the wireless LAN radio signal received from the "terminal A" corresponding to the particular terminal, it may be assumed that the seven MAC addresses are nearly in the same location, so that it may be considered that even newly found second AP identification information is near the location information of the first AP identification information, thereby matchingly storing the latitude/longitude coordinate value assigned to the lattice cell having the first AP identification information as the location estimation information of the second AP identification information.

Figure 7:
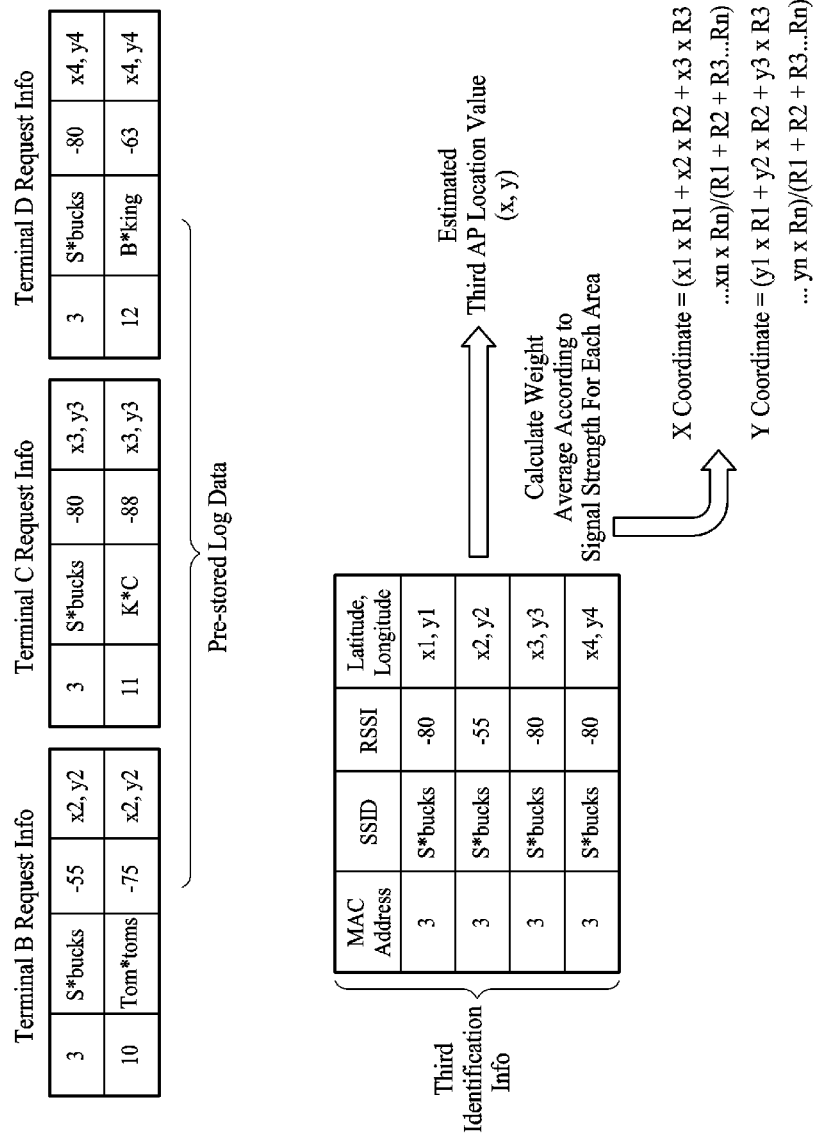
FIG. 7 a schematic view of examples of pre-stored log data, third AP identification information, and location estimation information according to at least one embodiment.

FIG. 7 a schematic view of examples of pre-stored log data, third AP identification information, and location estimation information according to at least one embodiment.

The AP location estimating device 140 identifies the second AP identification information and determines the second AP identification information as new log data. Then, when there is information corresponding to AP identification information in the log data pre-stored through another terminal by using the database 150, the AP location estimating device 140 identifies the AP identification information as the third AP identification information. Here, the pre-stored log data includes one or more of MAC address information, SSID information, a received signal strength indication, and latitude/longitude coordinate value information of the MAC address. As a result of the identification, it can be figured that the log data pre-stored through another terminal includes a total of three data pieces collected through a "terminal B", a "terminal C", and a "terminal D" as illustrated in FIG. 7.

That is, as illustrated in FIG. 7, the log data pre-stored through the "terminal B" includes MAC addresses of "3" and "10", the log data pre-stored through the "terminal C" includes MAC addresses of "3" and "11", and the log data pre-stored through the "terminal D" includes MAC addresses of "3" and "12". Here, since the AP identification information extracted from the wireless LAN radio signal received from the "terminal A" includes MAC addresses of "1", "2", "3", "4", "5", "6", and "7", the AP location estimating device 140 identifies the MAC address of "3" corresponding to the AP identification information among the MAC addresses of "3", "10", "11", and "12" of the pre-stored log data as the third AP identification information.

Meanwhile, since the AP location estimating device 140 has determined the location information of the "terminal A" and has identified there is the log data pre-stored through the "terminal "B", the "terminal C", and the "terminal D" by using the database 150, the third AP identification information includes a total of four data pieces as information collected from the "terminal A", the "terminal "B", the "terminal C", and the "terminal D". Here, for the MAC address of "3", the location information determined through the "terminal A" is (x1, y1), the location information determined through the "terminal B" is (x2, y2), the location information determined through the "terminal B" is (x3, y3), and the location information determined through the "terminal D" is (x4, y4). That is, the AP location estimating device 140 selects the weight value corresponding to each received signal strength range for the third AP identification information, and recognizes the location information calculated based on each location information and weight value assigned to each of the third AP identification information as precise location estimation information for the new log data. Here, the weight value is matched with a particular value preset according to the received signal strength indication, and the preset particular value has a larger weight value as the received signal strength is larger.

In a more detailed description, the AP location estimating device 140 calculates an weight average coordinate value for all weight values by multiplying each location information assigned to the third AP identification information by the weight value, and recognizes the weight average coordinate value for all weight values as the precise location estimation information for the new log data. That is, the AP location estimating device 140 calculates a weight average X coordinate value by multiplying each X coordinate value of the location information assigned to the third AP identification information by the weight value and then dividing a sum of products of the multiplications by a sum of all the weight values, calculates a weight average Y coordinate value by multiplying each Y coordinate value of the location information assigned to the third AP identification information by the weight value and then dividing a sum of products of the multiplications by a sum of all the weight values, and collects the average X coordinate value and the average Y coordinate value to recognize the average coordinate value of all weight values. For example, as illustrated in FIG. 7, there are a total of four data pieces having the same MAC address of "3". Here, the AP location estimating device 140 can select the weight value of "W8" corresponding to the received signal strength of "−80" since the received signal strength of (x1, y1) of the AP location estimating device 140 is "−80", select the weight value of "W5" corresponding to the received signal strength of "−55" since the received signal strength of (x2, y2) of the AP location estimating device 140 is "−55", select the weight value of "W8" corresponding to the received signal strength of "−80" since the received signal strength of (x3, y3) of the AP location estimating device 140 is "−80", and select the weight value of "W8" corresponding to the received signal strength of "−80" since the received signal strength of (x4, y4) of the AP location estimating device 140 is "−80". Meanwhile, it is assumed and described that weight values corresponding to received signal strength ranges from (x1, y1) to (xn, yn) are R1 to Rn in the present disclosure, respectively.

That is, the weight value of "W8" may be input to "R1" since the received signal strength of (x1, y1) is "−80", the weight value of "W5" may be input to "R2" since the received signal strength of (x2, y2) is "−55", the weight value of "W8" may be input to "R3" since the received signal strength of (x3, y3) is "−80", and the weight value of "W8" may be input to "R4" since the received signal strength of (x4, y4) is "−80". The X coordinate value is calculated as "(x1×R1+x2×R2+x3×R3+x4×R4)/(R1+R2+R3+R4)" through the above described manner. Meanwhile, the Y coordinate value is calculated as "(y1×R1+y2×R2+y3×R3+y4×R4)/(R1+R2+R3+R4)" through the above described manner.

Meanwhile, the AP location estimating device 140 selects information having a received signal strength indication equal to or larger than a preset threshold from the third AP identification information. For example, when the preset threshold is "−70", the AP location estimating device 140 can select only "two" data having the received signal strength of "−80" from the "four" data having the same MAC address of "3".

The AP location estimating device 140 calculates the weight average coordinate value by multiplying the selected information by the weight value, and recognizes the weight average coordinate value as the precise location estimation information for the new log data. The AP location estimating device 140 calculates the weight average X coordinate value by multiplying each of the selected information by a corresponding weight value, doing the sum of all the products of the multiplications, and then dividing the sum of all the products of the multiplications by a sum of all the weight values. The AP location estimating device 140 calculates the weight average Y coordinate value by multiplying each of the selected information by a corresponding weight value, doing the sum of all the products of the multiplications, and then dividing the sum of all the products of the multiplications by a sum of all the weight values corresponding to the selected information. And the AP location estimating device 140 collects the weight average X coordinate value and the weight average Y coordinate value to thusly recognize the collected result as the collected weight average coordinate value.

For example, after selecting only "two" data having the SSIDs of "S*bucks" and "FMI" from the "four" data having the same MAC address of "3", the AP location estimating device 140 can select the weight value of "W8" corresponding to the received signal strength of "−80" since the received signal strength of (x3, y3) is "−80", and select the weight value of "W8" corresponding to the received signal strength of "−80" since the received signal strength of (x4, y4) is "−80". Meanwhile, it is assumed and described that weight values corresponding to received signal strength ranges from (x1, y1) to (xn, yn) are R1 to Rn in the present disclosure, respectively.

That is, the weight value of "W8" may be input to "R3" since the received signal strength of (x3, y3) is "−80", and the weight value of "W8" may be input to "R4" since the received signal strength of (x4, y4) is "−80". The X coordinate value is calculated as "(x3×R3+x4×R4)/(R3+R4)" through the above described manner. Meanwhile, the Y coordinate value is calculated as "(y3×R3+y4×R4)/(R3+R4)" through the above described manner.

According to the present disclosure as described above, information which is not pre-stored in a database when the database is updated is classified, location information of the AP is estimated using log data, and then the location information is matchingly stored. Further, according to at least one embodiment, by estimating a location of the AP(s) by using log data of the user in wireless LAN based positioning, the DB for the wireless LAN based positioning is updated, and thus positioning accuracy may be improved. Moreover, since the location of the AP(s) is automatically estimated using the log data of the subscriber without manually updating the data when a separate DB for the wireless LAN positioning is configured, costs according to the DB configuration may be reduced.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. The computer readable media may include magnetic recording media, optical recording media, and media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from the subject matter and scope of this disclosure. Therefore, exemplary aspects of the present disclosure have not been described for limiting purposes. Accordingly, the scope of the disclosure is not to be limited by the above aspects but by the claims and the equivalents thereof.

What is claimed is:

1. A device for estimating an access point (AP) location, the device comprising:
    an AP identification information extractor configured to extract terminal AP identification information from a radio signal received from a terminal;
    an AP identification information identifier configured to
        identify AP identification information corresponding to the extracted terminal AP identification information, among information pre-stored in a database, as first AP identification information, and
        identify AP identification information which does not correspond to the information pre-stored in the database, among the extracted terminal AP identification information, as second AP identification information;
    a location determiner configured to determine location information of the terminal based on a latitude/longitude coordinate value assigned to each of the first AP identification information; and
    a location estimator configured to
        determine the second AP identification information as new log data, and
        recognize the location information as location estimation information of the new log data,
    wherein the AP identification information identifier is further configured to
        compare the new log data with log data pre-stored through another terminal, and
        identify AP identification information which corresponds to the log data pre-stored through said another terminal, among the second AP identification information, as third AP identification information, and
    wherein the location estimator is further configured to
        calculate a first weight average coordinate value for all weight values assigned to location information assigned to the third AP identification information, by multiplying each of the location information assigned to each of the third AP identification information by the corresponding weight value among the assigned weight values, and
        recognize the calculated first weight average coordinate value as precise location estimation information.

2. The device of claim 1, further comprising:
    the database configured to store lattice cells identified by a cell ID, wherein the radio signal is stored for each of the lattice cells.

3. The device of claim 1, wherein the location estimator configured to
    differentially assign a weight value for each of received signal strength ranges of the third AP identification information, and
    recognize location information calculated based on each of the location information assigned to each of the third AP identification information and the assigned weight value as the precise location estimation information for the new log data.

4. The device of claim 3, wherein the location estimator is further configured to
    calculate a weight average X coordinate value by
        multiplying each X coordinate value of the location information assigned to each of the third AP identification information by the corresponding weight value among assigned weight values,
obtaining a sum of all the products of the multiplications, and then
dividing the sum of all the products of the multiplications by a sum of all the weight values,
calculate a weight average Y coordinate value by
multiplying each Y coordinate value of the location information assigned to each of the third AP identification information by the corresponding weight value among assigned weight values,
obtaining a sum of all the products of the multiplications, and then
dividing the sum of all the products of the multiplications by a sum of all the weight values, and
recognize the weight average X coordinate value and the weight average Y coordinate value as the first weight average coordinate value for all weight values.

5. The device of claim 3, wherein
the weight value corresponds to a particular value preset according a received signal strength indication of the third AP identification information, and
the preset particular value has a greater weight value as the received signal strength indication is larger.

6. The device of claim 1, wherein the pre-stored log data includes at least one of MAC address information, Service Set Identifier (SSID) information, a Received Signal Strength Indication (RSSI), and latitude/longitude coordinate value information for the MAC address information.

7. The device of claim 1, further comprising:
an information selector configured to select information having a received signal strength indication equal to or greater than a preset threshold, from the third AP identification information,
wherein the location estimator is further configured to
calculate a second weight average coordinate value by multiplying the selected information by a weight value, and
recognize the calculated second weight average coordinate value as the precise location estimation information.

8. The device of claim 1, wherein, when the AP identification information extractor receives a Global Positioning System (GPS) positioning signal from the terminal, the AP identification information extractor is configured to recognize a latitude/longitude coordinate value corresponding to the GPS positioning signal as location measurement information for the new log data.

9. The device of claim 8, wherein the latitude/longitude coordinate value assigned to a lattice cell corresponding to the first AP identification information is a coordinate value of a center of the corresponding lattice cell.

10. The device of claim 1, wherein the AP identification information includes at least one of a MAC address of an AP relaying a wireless LAN signal, a received signal strength indication for each MAC address, AP channel information, and AP frequency information.

11. The device of claim 1, wherein the location determiner is further configured to determine an average value of latitude/longitude coordinate values assigned to respective first AP identification information, as the location information of the terminal.

12. An apparatus for estimating an access point (AP) location, the apparatus comprising:
a database configured to store data regarding lattice cells identified by a cell ID and a wireless Local Area Network (LAN) radio signal corresponding to each of the lattice cells;
an AP identification information extractor configured to extract terminal AP identification information from the wireless LAN radio signal which is received from a terminal;
an AP identification information identifier configured to
identify AP identification information which does not correspond to information pre-stored in the database, among the terminal AP identification information, as new log data, and
identify AP identification information corresponding to the terminal AP identification information, among log data pre-stored through another terminal, as identified AP identification information; and
a location estimator configured to
select a weight value corresponding to each of signal strength ranges of received signals, for the identified AP identification information, and
calculate location estimation information for the new log data based on each location information assigned to the identified AP identification information and the weight value,
wherein the location estimator is further configured to
calculate an average coordinate value of all weight values by multiplying each location information assigned to the AP identification information by the weight value, and
recognize the average coordinate value of all weight values as precise location estimation information for the new log data.

13. The apparatus of claim 12, further comprising:
an information selector configured to select information having a received signal strength indication which is equal to or greater than a preset threshold, from the identified AP identification information,
wherein the location estimator is further configured to
calculate a weight average coordinate value by multiplying the selected information by the weight value, and
recognize the weight average coordinate value as the location estimation information for the new log data.

14. A method of estimating an access point (AP) location, the method performed by an AP location estimating device and comprising:
extracting terminal AP identification information from a radio signal received from a terminal;
identifying AP identification information corresponding to the terminal AP identification information, among information pre-stored in a database, as first AP identification information;
identifying AP identification information which does not correspond to the information pre-stored in the database, among the terminal AP identification information, as second AP identification information;
determining location information of the terminal based on a latitude/longitude coordinate value assigned to each of the first AP identification information;
determining the second AP identification information as new log data;
recognizing the location information as location estimation information of the new log data;
comparing the new log data with log data pre-stored through another terminal;
identifying AP identification information which corresponds to the log data pre-stored through said another terminal, among the second AP identification information, as third AP identification information;

calculating a weight average coordinate value for all weight values assigned to location information assigned to the third AP identification information, by multiplying each of the location information assigned to each of the third AP identification information by the corresponding weight value among the assigned weight values; and recognizing the calculated first weight average coordinate value as precise location estimation information.

15. The method of claim 14, further comprising:

selecting a weight value corresponding to each of signal strength ranges of received signals for each of the third AP identification information; and recognizing location information calculated based on each of the location information assigned to each of the third AP identification information and the weight value, as precise location estimation information for the new log data.

16. A method of estimating an access point (AP) location performed by a AP location estimating device, the method comprising:

extracting terminal AP identification information from a radio signal received from a terminal;

identifying AP identification information which does not correspond to information pre-stored in the database, among the terminal AP identification information, as new log data;

identifying AP identification information corresponding to the terminal AP identification information, among log data pre-stored through another terminal, as identified AP identification information;

selecting a weight value corresponding to each of signal strength ranges of received signal strength ranges, for the identified AP identification information;

calculating location estimation information for the new log data based on each location information assigned to the identified AP identification information and the weight value;

calculating an average coordinate value of all weight values by multiplying each location information assigned to the AP identification information by the weight value; and recognizing the average coordinate value of all weight values as precise location estimation information for the new log data.

* * * * *